United States Patent
Tang (10) Patent No.: US 10,972,330 B2
(45) Date of Patent: Apr. 6, 2021

(54) DATA TRANSMISSION METHOD AND DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 149 days.

(21) Appl. No.: 16/085,131

(22) PCT Filed: Jun. 7, 2016

(86) PCT No.: PCT/CN2016/085054
§ 371 (c)(1),
(2) Date: Sep. 14, 2018

(87) PCT Pub. No.: WO2017/210853
PCT Pub. Date: Dec. 14, 2017

(65) Prior Publication Data
US 2019/0089569 A1 Mar. 21, 2019

(51) Int. Cl.
*H04W 72/04* (2009.01)
*H04L 27/26* (2006.01)
(Continued)

(52) U.S. Cl.
CPC ........ *H04L 27/2666* (2013.01); *H04L 1/1854* (2013.01); *H04L 5/0044* (2013.01);
(Continued)

(58) Field of Classification Search
None
See application file for complete search history.

(56) References Cited

U.S. PATENT DOCUMENTS

2014/0086116 A1* 3/2014 Seo ............... H04J 11/003
370/280
2016/0020891 A1 1/2016 Jung et al.
(Continued)

FOREIGN PATENT DOCUMENTS

CN 101162981 A 4/2008
CN 103873183 A 6/2014

OTHER PUBLICATIONS

Fujitsu NR Frame structure considerations for low latency TDD operation 3GPP TSG RAN WGI Meeting #85, R1-164332 May 27, 2015.
(Continued)

*Primary Examiner* — Edan Orgad
*Assistant Examiner* — Emmanuel K Maglo
(74) *Attorney, Agent, or Firm* — Hodgson Russ LLP (57) ABSTRACT

Disclosed is a data transmission method, including: determining a time domain structure, the time domain structure chronologically and sequentially including a first downlink part, a second downlink part, a first uplink part, and a second uplink part, wherein a guard period GP is further included between the second downlink part and the first uplink part; and transmitting data according to the time domain structure; wherein, information transmitted by the first uplink part corresponds to information transmitted by the first downlink part, and information transmitted by the second uplink part corresponds to information transmitted by the second downlink part.

15 Claims, 5 Drawing Sheets

(51) Int. Cl.
*H04W 72/00* (2009.01)
*H04L 1/18* (2006.01)
*H04L 5/00* (2006.01)

(52) U.S. Cl.
CPC ........ *H04L 5/0094* (2013.01); *H04L 27/2607* (2013.01); *H04W 72/00* (2013.01); *H04W 72/042* (2013.01); *H04W 72/0446* (2013.01)

(56) References Cited

U.S. PATENT DOCUMENTS

| | | | |
|---|---|---|---|
| 2016/0080133 | A1 | 3/2016 | Golitschek Edler von Elbwart et al. |
| 2016/0270070 | A1* | 9/2016 | Mukkavilli ............ H04L 1/1861 |
| 2017/0026992 | A1* | 1/2017 | Jiang ..................... H04L 5/1469 |
| 2017/0222696 | A1* | 8/2017 | Ji ........................ H04B 7/0417 |
| 2017/0272296 | A1* | 9/2017 | Manolakos .......... H04W 72/042 |
| 2017/0295589 | A1* | 10/2017 | Sundararajan ...... H04W 74/002 |
| 2018/0124773 | A1* | 5/2018 | Lee ....................... H04L 5/0091 |
| 2018/0213501 | A1* | 7/2018 | Lee ................... H04W 74/0833 |
| 2018/0254851 | A1* | 9/2018 | Roessel ................. H04L 1/009 |
| 2018/0352540 | A1* | 12/2018 | Lee ....................... H04L 5/0048 |
| 2018/0359122 | A1* | 12/2018 | Lee ....................... H04L 5/0044 |
| 2019/0037640 | A1* | 1/2019 | Xiong ................... H04L 1/1861 |
| 2019/0053243 | A1* | 2/2019 | Lee ....................... H04L 5/0094 |
| 2019/0068341 | A1* | 2/2019 | Seo ................... H04W 72/0446 |
| 2019/0069164 | A1* | 2/2019 | Kishiyama .............. H04W 8/20 |
| 2019/0098626 | A1* | 3/2019 | Yi ..................... H04W 72/0446 |
| 2019/0116007 | A1* | 4/2019 | Yi ....................... H04L 27/2607 |
| 2019/0372720 | A1* | 12/2019 | Lee ........................ H04L 1/1812 |
| 2020/0022188 | A1* | 1/2020 | Lee ........................... H04L 5/00 |

OTHER PUBLICATIONS

International Search Report dated Feb. 27, 2017; PCT/CN2016/085054.
Huawei et al., "Discussion on Frame Structure for NR", 3GPP TSG RAN Meeting #85, R1-164032, Nanjing, China, May 23, 2016.
Huawei et al., "Discussion on enhanced frame structure type 2 for latency reduction," 3GPP TSG RAN WG1 Meeting #85, R1-164069, May 2016, 5 pages.
Qualcomm Incorporated, "Candidate Frame Structures," 3GPP TSG-RAN WG1 #85, R1-164695, May 2016, 8 pages.
ZTE et al., "Frame structure design for NR," 3GPP TSG RAN WG1 Meeting #85, R1-164274, May 2016, 11 pages.
IPI, Office Action for IN Application No. 201817043972, dated Oct. 12, 2020.
TIPO, Office Action for TW Application No. 106117718, dated Sep. 30, 2020.

* cited by examiner

DATA TRANSMISSION METHOD AND DEVICE

CROSS-REFERENCE TO RELATED APPLICATION

This application is the 371 application of PCT Application No. PCT/CN2016/085054, filed Jun. 7, 2016, the entire contents of which are incorporated herein by reference.

TECHNICAL FIELD

The embodiments of the present disclosure relate to the field of communications, and more particularly, to a data transmission method and device.

BACKGROUND

A self-contained subframe structure refers to limiting a variety of signals related to one Downlink (DL) transmission or one Uplink (UL) transmission of a certain terminal device into one subframe period without relying on interpolation and other joint operations with an adjacent subframe. The design of the self-contained subframe structure is an important technical improvement in a 5G system. On one hand, the forward compatibility of a 5G air interface can be guaranteed. The adjacent subframe may be used for new services or new technologies that will be introduced by 5G in the future (e.g., vertical industry applications such as the Internet of Things), and these services or new technologies may adopt completely different designs; therefore, "completely blank" subframe resources should be reserved for these unknown technologies as much as possible, thus avoiding any pre-set constraints. If the current design of 5G requires to basing on joint operations among multiple subframes, the development space for 5G new technologies may be limited. On the other hand, an uplink and downlink loopback operation with a low time delay may be implemented. For the low time-delay requirement of 5G, it is an effective improvement way to speed up a rhythm of various uplink and downlink loopback operations. By placing downlink resource allocation (DL SA), downlink data, and downlink ACK/NACK in one subframe, or placing Uplink Resource Grant (UL Grant), and uplink data in one subframe, time delays of downlink data transmission and uplink data transmission can be minimized; or, by placing downlink Channel State Information (CSI), a Reference Signal (RS) (e.g., CSI-RS), and a CSI report in one subframe, the time delay of channel measurement feedback can be minimized.

The self-contained subframe structure may be roughly divided into two types of subframes: DL-dominant subframes and UL-dominant subframes. In addition to a main portion configured to transmit Downlink Control Signaling (e.g., DL SA) and Downlink Data (DL Data), the DL-dominant subframe may also contain an uplink control channel carrying downlink ACK/NACK. In addition to transmitting uplink control signaling and Uplink Data (UL Data) by a main portion, the UL-dominant subframe may also transmit related Downlink Control Signaling (e.g., UL Grant).

However, such associated and tightly jointed structure has a certain drawback, i.e., the problem of processing time delay is not considered. For the DL-dominant subframes, after the terminal receives the downlink data, since ACK/NACK contents may be determined only after the downlink data is demodulated and decoded, the processing time delay needs several tens or even hundreds of microseconds (μs). In the same way, for the UL-dominant subframes, the terminal may start sending the uplink data only after demodulating the UL Grant signaling in the downlink control signaling, which also needs a processing time delay of several tens of microseconds (μs).

SUMMARY

The embodiments of the present disclosure provide a data transmission method, which can fully utilize time domain resources and avoid wasting the time domain resources.

According to a first aspect, there is provided a data transmission method, including:

determining a time domain structure, the time domain structure chronologically and sequentially including a first downlink part, a second downlink part, a first uplink part, and a second uplink part, wherein a guard period GP is further included between the second downlink part and the first uplink part; and transmitting data according to the time domain structure;

According to a second aspect, there is provided a data transmission device, including:

a determination unit configured to determine a time domain structure, the time domain structure chronologically and sequentially including a first downlink part, a second downlink part, a first uplink part, and a second uplink part, wherein a guard period (GP) is further included between the second downlink part and the first uplink part; and a transmission unit configured to transmit data according to the time domain structure determined by the determination unit;

wherein, information transmitted by the first uplink part corresponds to information transmitted by the first downlink part, and information transmitted by the second uplink part corresponds to information transmitted by the second downlink part. The device may be configured to implement the data transmission method in the method according to the first aspect.

According to a third aspect, there is provided a data transmission device, including: a processor, and a memory for storing instructions executable by the processor; wherein the processor is configured to perform the data transmission method described in the foregoing first aspect and various implementation manners.

According to a fourth aspect, there is provided a computer readable storage medium storing a program that causes the data transmission device to perform any one of the data transmission method described in the foregoing first aspect and various implementation manners.

According to a fifth aspect, there is provided a data transmission method, including:

sending, by a network device, a second downlink part to a terminal; and receiving, by the network device, a first uplink part sent by the terminal, wherein the first uplink part and the second downlink part respectively belong to a first time domain unit and a second time domain unit adjacent to the first time domain unit;

wherein a Guard Period GP is located between the second downlink part and the first uplink part.

According to a sixth aspect, there is provided a network device, including: a processor; and a memory for storing instructions executable by the processor; wherein the processor is configured to perform the data transmission method described in the foregoing fifth aspect and various implementation manners.

According to a seventh aspect, there is provided a computer-readable storage medium having stored therein program that, when executed, causes a network device to perform the data transmission method described in the foregoing fifth aspect and various implementation manners.

According to a eighth aspect, there is provided a data transmission method, including:

receiving, by a terminal, a second downlink part sent by a network device; and sending, by the terminal, a first uplink part to the network device, wherein the first uplink part and the second downlink part respectively belong to a first time domain unit and a second time domain unit adjacent to the first time domain unit;

wherein a Guard Period GP is located between the second downlink part and the first uplink part.

According to a ninth aspect, there is provided a terminal, including: a processor; and a memory for storing instructions executable by the processor; wherein the processor is configured to perform the data transmission method described in the foregoing eighth aspect and various implementation manners.

According to a tenth aspect, there is provided a computer-readable storage medium having stored therein program that, when executed, causes a terminal to perform the data transmission method described in the foregoing eighth aspect and various implementation manners.

BRIEF DESCRIPTION OF THE DRAWINGS

In order to illustrate the technical solutions in the embodiments of the present disclosure more clearly, the drawings used in the description of the embodiments or the related art will be briefly described below. Obviously, the drawings in the following description are merely some embodiments of the present disclosure. For those of ordinary skills in the art, other drawings may also be obtained based on these drawings without paying creative work.

DETAILED DESCRIPTION

The technical solutions in the embodiments of the present disclosure will be described clearly and completely with reference to the accompanying drawings in the embodiments of the present disclosure. Apparently, the described embodiments are merely some but not all of the embodiments of the present disclosure. Based on the embodiments of the present disclosure, all other embodiments obtained by those of ordinary skills in the art without paying creative work shall fall within the protection scope of the present disclosure.

Therefore, in the preliminary self-contained subframe structure formed currently, a certain processing time interval is needed to be maintained between the downlink data and the corresponding ACK/NACK, and between the UL Grant and the corresponding uplink data.

A Guard Period (GP) is included between the downlink and the uplink. Although the GP may be used to provide a part of the processing time interval, when the length of the GP is shorter than the processing time interval, time domain resource is wasted.

Figure 1:
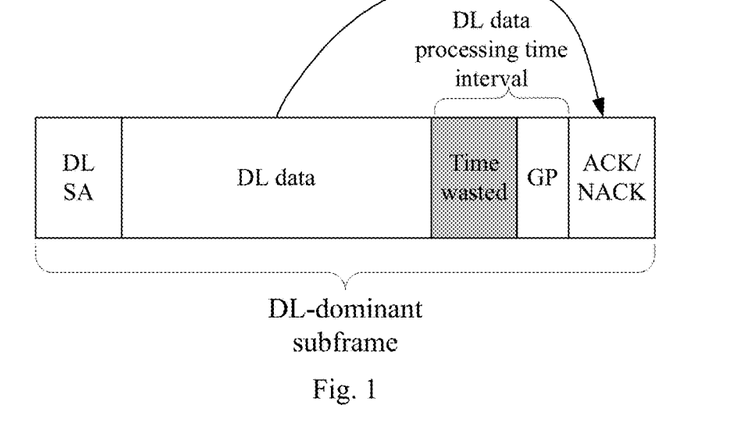
FIG. 1 is a schematic diagram of a DL-dominant subframe.
Figure 2:
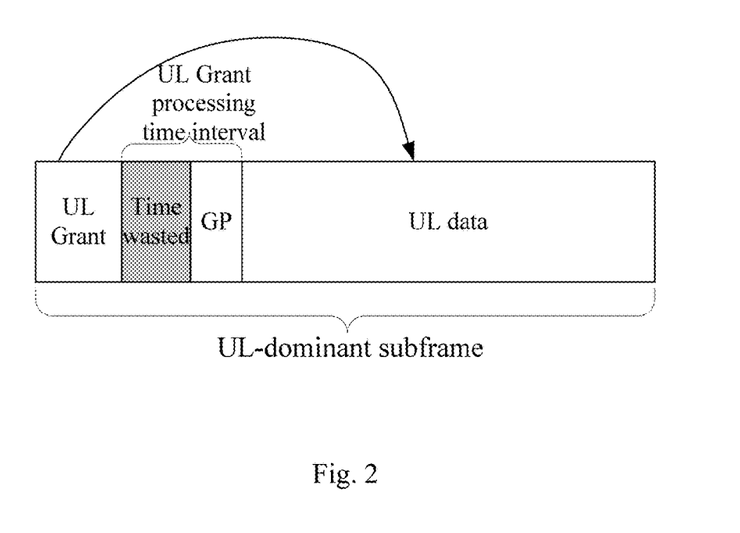
FIG. 2 is a schematic diagram of a UL-dominant subframe.

The current self-contained subframe structure includes a DL-dominant subframe and a UL-dominant subframe. As shown in FIG. 1, which is a schematic diagram of a DL-dominant subframe, the DL-dominant subframe is configured to transmit a Downlink Control Signaling (DL SA), DL data, and an uplink control channel carrying downlink ACK/NACK. As shown in FIG. 2, which is a schematic diagram of a UL-dominant subframe, the UL-dominant subframe is configured to transmit an uplink control signaling, UL data, and a related Downlink Control Signaling (e.g., UL Grant). As shown in FIG. 1 and FIG. 2, when a length of the GP is less than the processing time interval, the time domain resource is wasted.

Figure 3:
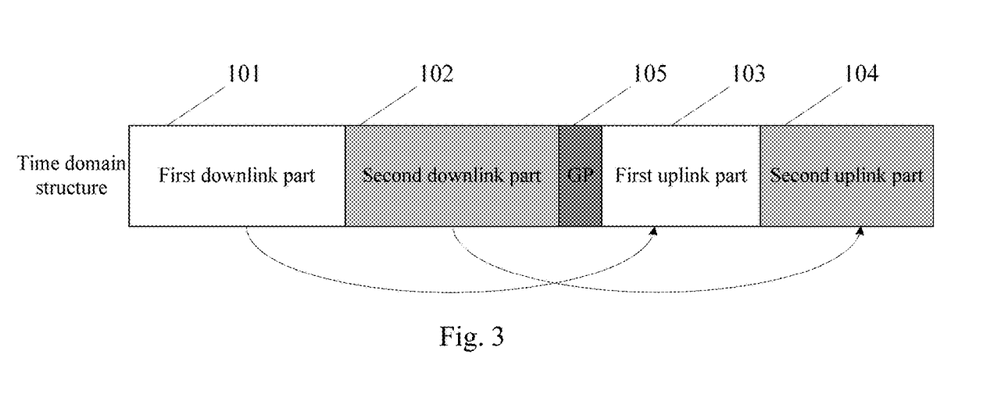
FIG. 3 is a schematic diagram of a time domain structure according to an embodiment of the present disclosure.

An embodiment of the present disclosure provides a time domain structure. As shown in FIG. 3, the time domain structure includes a first downlink part 101, a second downlink part 102, a first uplink part 103, and a second uplink part 104, wherein a guard period GP 105 is further included between the second downlink part 102 and the first uplink part 103.

Information transmitted by the first uplink part 101 corresponds to information transmitted by the first downlink part 103, and information transmitted by the second uplink part 102 corresponds to information transmitted by the second downlink part 104, as indicated by arrows in FIG. 3.

It should be noted that the information transmitted in the embodiments of the present disclosure may be at least one of a signaling, a signal, and a channel. The channel may carry the signaling and/or data.

Specifically, the time domain structure in the embodiments of the present disclosure chronologically and sequentially includes a first downlink part, a second downlink part, a first uplink part, and a second uplink part, wherein a GP is between the second downlink part and the first uplink part. In other words, the time domain structure in the embodiments of the present disclosure chronologically and sequentially includes the first downlink part, the second downlink part, the GP, the first uplink part and the second uplink part. Or, it may be said that the time domain structure in the embodiments of the present disclosure includes the first downlink part, the second downlink part, the GP, the first uplink part, and the second uplink part continuously arranged in a chronological order. Alternatively, it may also be understood that the time domain structure in the embodiments of the present disclosure includes the following parts that are tightly jointed in a chronological order: the first downlink part, the second downlink part, the GP, the first uplink part and the second uplink part.

An end moment of the first downlink part and a start moment of the second downlink part are the same moment, and an end moment of the first uplink part and a start moment of the second uplink part are the same moment. A difference value between the start moment of the first uplink part and the end moment of the second downlink part is equal to a time length of the GP.

Optionally, as an implementation manner, the first downlink part 101 may be configured to transmit downlink data, and accordingly, the first uplink part 103 may be configured to transmit an uplink control signaling corresponding to the downlink data. The second downlink part 102 may be configured to transmit a downlink control signaling, and accordingly, the second uplink part 104 may be configured to transmit the uplink data scheduled by the downlink control signaling. As an example, the uplink control signaling may include ACK/NACK information, and the downlink control signaling may include UL Grant information.

It may be understood that the information transmitted by the first uplink part corresponding to the information transmitted by the first downlink part means that the uplink control signaling transmitted by the first uplink part corresponds to the downlink data transmitted by the first downlink part. The information transmitted by the second uplink part corresponding to the information transmitted by the second downlink part means that the uplink data transmitted by the second uplink part is scheduled by the downlink control signaling transmitted by the second downlink part.

The first uplink part does not transmit data (uplink data). For example, the first uplink part may be configured to only transmit the uplink control signaling corresponding to the downlink data. The second downlink part does not transmit data (downlink data). For example, the second downlink part may be configured to only transmit the downlink control signaling.

Optionally, as an example, the first downlink part 101 may be configured to transmit a first downlink control signaling and the downlink data, and accordingly, the first uplink part 103 may be configured to transmit a first uplink control signaling corresponding to the downlink data. For example, the first downlink control signaling is Scheduling Assignment (SA), and the first uplink control signaling may include Acknowledge/Non Acknowledgement (ACK/NACK) information. The second downlink part 102 may be configured to transmit a second downlink control signaling, and accordingly, the second uplink part 104 may be configured to transmit a second uplink control signaling and the uplink data scheduled by the second downlink control signaling. For example, the second downlink control signaling may include the second uplink control signaling and Uplink Resource Grant (UL Grant) information of the uplink data.

The first uplink part does not transmit data (uplink data). For example, the first uplink part may be configured to only transmit the first uplink control signaling corresponding to the downlink data. The second downlink part does not transmit data (downlink data). For example, the second downlink part may be configured to only transmit the second downlink control signaling.

The time domain structure in the embodiments of the present disclosure may include a first time domain unit and a second time domain unit. The time domain unit in the embodiments of the present disclosure may refer to a minimum time domain scheduling unit for transmitting data. Accordingly, a length of the time domain unit may be a length of the minimum time domain scheduling unit. It may be seen that the minimum time domain scheduling unit for transmitting data only includes a continuous period of downlink data transmission time and/or a continuous period of uplink data transmission time. For example, it may be a minimum time domain scheduling unit for downlink data or a minimum time domain scheduling unit for uplink data. For example, the minimum time domain scheduling unit for transmitting data may be a subframe, i.e., the time domain unit is a subframe. Accordingly, the length of the time domain unit may be a length of the subframe. The time domain length of the time domain unit is not limited by the embodiments of the present disclosure. For example, the length of the time domain unit may be equal to 1 ms or greater than 1 ms. For another example, the length of the time domain unit may be equal to 0.5 ms or 0.2 ms, etc.

The first time domain unit may include the first downlink part and the first uplink part, and the second time domain unit may include the second downlink part and the second uplink part.

Figure 4:
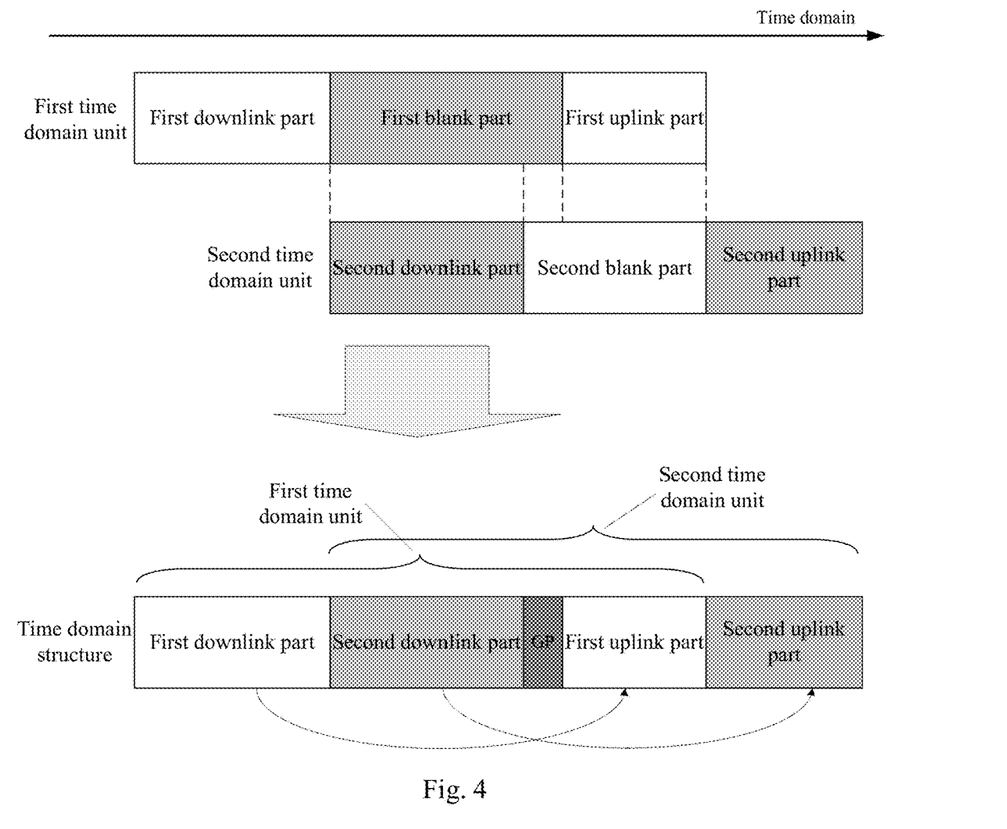
FIG. 4 is a schematic diagram of a first time domain unit and a second time domain unit according to an embodiment of the present disclosure.

Optionally, in the first time domain unit, a first blank part is included between the first downlink part and the first uplink part; and in the second time domain unit, a second blank part is included between the second downlink part and the second uplink part. As shown in FIG. 4, a time domain length of the first blank part is equal to a sum of a time domain length occupied by the second downlink part and a time domain length of the GP, and a time domain length of the second blank part is equal to a sum of the time domain length of the GP and a time domain length occupied by the first uplink part.

That is, the first time domain unit may include the first downlink part, the first blank part, and the first uplink part. The first blank part refers to a blank time period between the uplink and the downlink. The second time domain unit may include the second downlink part, the second blank part and the second uplink part. The second blank part refers to a blank time period between the uplink and the downlink.

Alternatively, it may also be understood that the first time domain unit chronologically and sequentially includes the first downlink part, the first blank part, and the first uplink part. The second time domain unit chronologically and sequentially includes the second downlink part, the second blank part, and the second uplink part. Moreover, the first time domain unit and the second time domain unit partially overlap in time. Or, the first downlink part and the first uplink part in the first time domain unit and the second downlink part and the second uplink part in the second time domain unit are transmitted alternately, i.e., the first downlink part in the first time domain unit is transmitted first, then the second downlink part in the second time domain unit is transmitted, and then the first uplink part in the first time domain unit is transmitted, and finally the second uplink part in the second time domain unit is transmitted.

In the embodiments of the present disclosure, the first time domain unit and the second time domain unit are two adjacent time domain units. For example, the first time domain unit may be an $N^{th}$ time domain unit in the entire transmission process, and the second time domain unit may be an $(N+1)^{th}$ time domain unit in the entire transmission process. For example, when the first time domain unit is a first subframe, and the second time domain unit is a second subframe, the second time domain unit is a next subframe adjacent to the first time domain unit. It should be noted that the "adjacent" here should not be interpreted as: any information transmission of the second time domain unit is after all the information transmission in the first time domain unit. The "adjacent" here may be understood as: a start moment of information transmission in the second time domain unit is after a start moment of information transmission in the first time domain unit, and/or an end moment of the information transmission in the second time domain unit is after an end moment of the information transmission in the first time domain unit.

It may be seen that the time domain resource occupied by the first blank part is the same as the time domain resource occupied by the second downlink part and the GP. The time domain resource occupied by the second blank part is the same as the time domain resource occupied by the first uplink part and the GP. In other words, a section of the first blank part is occupied by the second downlink part of the second time domain unit, and other unoccupied section of the first blank part is GP. It may be understood that the GP is a GP common to the first time domain unit and the second time domain unit. Similarly, a section of the second blank part is occupied by the first uplink part of the first time domain unit, and other unoccupied section of the second blank part is GP. It may be understood that the GP is a GP common to the first time domain unit and the second time domain unit. Alternatively, it may also be understood that a part of the signal (i.e., the signal transmitted by the second downlink part) in the second time domain unit occupies a part of the blank time period (i.e., the first blank part) of the first time domain unit, and an unoccupied part is the GP between the uplink and the downlink. Alternatively, with reference to FIG. 4, it may be understood that a part where the first blank part and the second blank part are overlapped is GP.

Optionally, the first downlink part in the first time domain unit may be configured to transmit a first downlink control signaling and the downlink data, and the first uplink part in the first time domain unit may be configured to transmit a first uplink control signaling corresponding to the downlink data. For instance, the first downlink control signaling is SA, and the first uplink control signaling may include ACK/NACK information. The time domain length of the first blank part is not limited by the embodiments of the present disclosure. As an example, the time domain length of the first blank part may be equal to a processing time interval of the downlink data. Specifically, the time domain length of the first blank part may be determined according to an operation process of demodulating and decoding the downlink data by a receiving end (for example, a terminal) of the downlink data.

The second downlink part in the second time domain unit may be configured to transmit a second downlink control signaling, and the second uplink part in the second time domain unit may be configured to transmit a second uplink control signaling and the uplink data scheduled by the second downlink control signaling. For example, the second downlink control signaling may include the second uplink control signaling and UL Grant information of the uplink data. The time domain length of the second blank part is not limited by the embodiments of the present disclosure. As another example, the time domain length of the second blank part in the embodiments of the present disclosure may be equal to the processing time interval of the UL Grant. Specifically, the time domain length of the second blank part may be determined according to an operation process of demodulating and decoding the second downlink control signaling by a receiving end (for example, a terminal) of the second downlink control signaling.

It may be seen that in this embodiment, the first time domain unit is a self-contained time domain unit, and the second time domain unit is also a self-contained time domain unit. The time domain structure in the embodiments of the present disclosure is determined based on a TDD (Time Division Duplexing) self-contained time domain unit of discontinuous symbols. Moreover, the first time domain unit and the second time domain unit are arranged in an interleaved manner. For example, if the time domain unit is a subframe, then the first time domain unit is a first self-contained subframe, and the second time domain unit is a second self-contained subframe.

Optionally, as another implementation manner, the second uplink part in the time domain structure may not transmit any information. At this time, it may be understood that the second uplink part does not exist. That is, the time domain structure includes a first downlink part, a second downlink part and a first uplink part, wherein a GP is further included between the second downlink part and the first uplink part. Moreover, information transmitted by the first uplink part corresponds to information transmitted by the first downlink part.

Specifically, the time domain structure in the embodiments of the present disclosure chronologically and sequentially includes a first downlink part, a second downlink part and a first uplink part, wherein a GP is between the second downlink part and the first uplink part. In other words, the time domain structure in the embodiments of the present disclosure chronologically and sequentially includes the first downlink part, the second downlink part, the GP and the first uplink part. Or, it may be said that the time domain structure in the embodiments of the present disclosure includes the first downlink part, the second downlink part, the GP, and the first uplink part continuously arranged in a chronological order. Alternatively, it may also be understood that the time domain structure in the embodiments of the present disclosure includes the following parts that are tightly jointed in a chronological order: the first downlink part, the second downlink part, the GP and the first uplink part.

An end moment of the first downlink part and a start moment of the second downlink part are the same moment, and a difference between a start moment of the first uplink part and an end moment of the second uplink part is equal to the time length of the GP.

Figure 5:
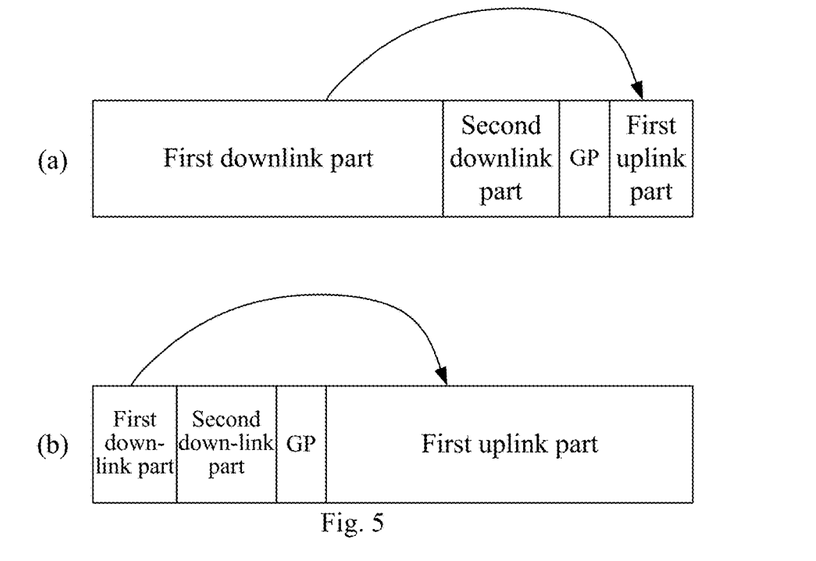
FIG. 5(a) and FIG. 5(b) are another schematic diagrams of the time domain structure according to the embodiment of the present disclosure.

As an example, as shown in FIG. 5(a), the first downlink part is configured to transmit downlink data, the second downlink part is configured to transmit downlink information, and the first uplink part is configured to transmit an uplink control signaling corresponding to the downlink data. As an example, the uplink control signaling may include ACK/NACK information.

It may be understood that the information transmitted by the first uplink part corresponding to the information transmitted by the first downlink part means that the uplink control signaling transmitted by the first uplink part corresponds to the downlink data transmitted by the first downlink part.

The downlink information transmitted by the second downlink part may include a downlink control signaling and/or data, i.e., the second downlink part may transmit the downlink control signaling and/or data, which is not limited in the present disclosure. As an example, the second downlink part may not transmit data, the second downlink part may be configured to only transmit the downlink control signaling, i.e., the downlink information transmitted by the second downlink part only includes the downlink control signaling. As another example, the second downlink part may transmit data and the downlink control signaling, and the downlink control signaling and the data transmitted by the second downlink part does not need to get a feedback immediately.

Specifically, the first downlink part may be configured to transmit a first downlink control signaling and first downlink data, and accordingly, the first uplink part may be configured to transmit a first uplink control signaling corresponding to the first downlink data. For instance, the first downlink control signaling is SA, and the first uplink control signaling may be ACK/NACK information.

Optionally, the second downlink part may only transmit the second downlink control signaling, or the second downlink part may transmit second downlink data and the second downlink control signaling that do not need to get an ACK/NACK feedback immediately.

As an another example, as shown in FIG. 5(b), the first downlink part is configured to transmit a downlink control signaling, the second downlink part is configured to transmit the downlink information, and the first uplink part is configured to transmit uplink data scheduled by the downlink control signaling. As an example, the downlink control signaling may include UL Grant information.

It may be understood that the information transmitted by the first uplink part corresponding to the information transmitted by the first downlink part means that the uplink data transmitted by the first uplink part is scheduled by the downlink control signaling transmitted by the first downlink part.

The downlink information transmitted by the second downlink part may include a downlink control signaling and/or data, i.e., the second downlink part may transmit the downlink control signaling and/or data, which is not limited in the present disclosure. As an example, the second downlink part may not transmit data, the second downlink part may be only configured to transmit the downlink control signaling, i.e., the downlink information transmitted by the second downlink part only includes the downlink control signaling. As another example, the second downlink part may transmit data and the downlink control signaling, and the data and the downlink control signaling transmitted by the second downlink part do not need to get a feedback immediately.

Specifically, the first downlink part may be configured to transmit a second downlink control signaling, and accordingly, the first uplink part may be configured to transmit a second uplink control signaling and uplink data scheduled by the second downlink control signaling. For example, the second downlink control signaling may be Uplink Resource Grant (UL Grant) information of the second uplink control signaling and the uplink data.

Optionally, the second downlink part may only transmit the second downlink control signaling, or the second downlink part may transmit the second downlink data and the second downlink control signaling that do not need to get an ACK/NACK feedback immediately.

Optionally, as another implementation manner, the first downlink part in the time domain structure may not transmit any information. At this time, it may be understood that the first downlink part does not exist. That is, the time domain structure includes the second downlink part, the first uplink part and the second uplink part, wherein the GP is further included between the second downlink part and the first uplink part. Moreover, the information transmitted by the second uplink part corresponds to the information transmitted by the second downlink part.

Specifically, the time domain structure in the embodiments of the present disclosure chronologically and sequentially includes a second downlink part, a first uplink part and a second uplink part, wherein a GP is between the second downlink part and the first uplink part. In other words, the time domain structure in the embodiments of the present disclosure chronologically and sequentially includes the second downlink part, the GP, the first uplink part and the second uplink part. Or, it may be said that the time domain structure in the embodiments of the present disclosure includes the second downlink part, the GP, the first uplink part and the second uplink part continuously arranged in a chronological order. Alternatively, it may also be understood that the time domain structure in the embodiments of the present disclosure includes the following parts that are tightly jointed in a chronological order: the second downlink part, the GP, the first uplink part and the second uplink part.

An end moment of the first uplink part and a start moment of the second uplink part are the same moment. A difference value between the start moment of the first uplink part and the end moment of the second downlink part is equal to a time length of the GP.

Figure 6:
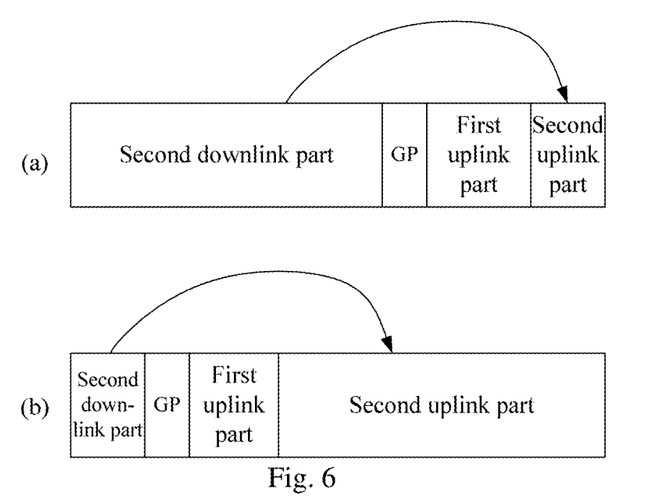
FIG. 6(a) and FIG. 6(b) are another schematic diagrams of the time domain structure according to the embodiment of the present disclosure.

As an example, as shown in FIG. 6(a), the second downlink part is configured to transmit downlink data, the first uplink part is configured to transmit uplink information, and the second uplink part is configured to transmit an uplink control signaling corresponding to the downlink data. As an example, the uplink control signaling may include ACK/NACK information.

It may be understood that the information transmitted by the second uplink part corresponding to the information transmitted by the second downlink part means that the uplink control signaling transmitted by the second uplink part corresponds to the downlink data transmitted by the second downlink part.

The uplink information transmitted by the first uplink part may include an uplink control signaling and/or data, i.e., the first uplink part may transmit the uplink control signaling and/or data, which is not limited in the present disclosure. As an example, the first uplink part may not transmit data, and the first uplink part may be only configured to transmit an uplink control signaling, i.e., the uplink information transmitted by the first uplink part only includes the uplink control signaling. As another example, the first uplink part may transmit data and an uplink control signaling, and the data and the uplink control signaling transmitted by the first uplink part do not depend on UL Grant information.

Specifically, the second downlink part may be configured to transmit a first downlink control signaling and the downlink data, and accordingly, the second uplink part may be configured to transmit a first uplink control signaling corresponding to the downlink data. For instance, the first downlink control signaling is SA, and the first uplink control signaling may be ACK/NACK information.

Optionally, the first uplink part may only transmit the first uplink control signaling, or the first uplink part may transmit the first uplink data and the first uplink control signaling which are not depending on the UL Grant information.

As an another example, as shown in FIG. 6(b), the second downlink part is configured to transmit a downlink control signaling, the first uplink part is configured to transmit the uplink information, and the second uplink part is configured to transmit uplink data scheduled by the downlink control signaling. As an example, the downlink control signaling may include UL Grant information.

It may be understood that the information transmitted by the second uplink part corresponding to the information transmitted by the second downlink part means that the uplink data transmitted by the second uplink part is scheduled by the downlink control signaling transmitted by the second downlink part.

The uplink information transmitted by the first uplink part may include an uplink control signaling and/or data, i.e., the first uplink part may transmit the uplink control signaling and/or data, which is not limited in the present disclosure. As an example, the first uplink part may not transmit data, and the first uplink part may be only configured to transmit an uplink control signaling, i.e., the uplink information transmitted by the first uplink part only includes the uplink control signaling. As another example, the first uplink part may transmit data and an uplink control signaling, and the data and uplink control signaling transmitted by the first uplink part do not depend on UL Grant information.

Specifically, the second downlink part may be configured to transmit a second downlink control signaling, and accordingly, the second uplink part may be configured to transmit a second uplink control signaling and second uplink data scheduled by the second downlink control signaling. For example, the second downlink control signaling may be the second uplink control signaling and Uplink Resource Grant (UL Grant) information of the second uplink data.

Optionally, the first uplink part may only transmit the first uplink control signaling, or the first uplink part may transmit the first uplink data and the first uplink control signaling which are not depending on the UL Grant information.

In the embodiments of the present disclosure, the time domain structures as shown in FIG. 5(a), FIG. 5(b), FIG. 6(a) and FIG. 6(b) may be subframes, for example, may be special subframes. A time domain length of the time domain structure is not limited by the embodiments of the present disclosure, for example, the time domain length may be equal to 1 ms, or may be greater than 1 ms, and for another example, the length of the time domain unit may be equal to 0.5 ms or 0.2 ms, or the like.

It may be seen that in the embodiments of the present disclosure, the time domain structure as shown in FIG. 5(a) or FIG. 6(a) may be used when transmitting downlink data. The time domain structure as shown in FIG. 5(b) or FIG. 6(b) may be used when transmitting uplink data. The time domain structure as shown in FIG. 3 may be used when transmitting uplink and downlink data.

In addition, it should be noted that the downlink control signaling in the embodiments of the present disclosure may include downlink control information, and the downlink control information is not limited to the information listed in the embodiments of the present disclosure. The uplink control signaling in the embodiments of the present disclosure may include uplink control information, and the uplink control information is not limited to the information listed in the embodiments of the present disclosure.

For example, the downlink control signaling may include Downlink Control Information (DCI). The DCI may be DCI for indicating downlink transmission or DCI for indicating uplink transmission. The uplink control signaling may include a Scheduling Report (SR), etc.

The time domain structure in the embodiments of the present disclosure may fully utilize the processing time of the downlink data/control signaling. Specifically, in the existing DL-dominant self-contained subframe, after the terminal receives the downlink data, the ACK/NACK contents need to be determined after the downlink data is demodulated and decoded, i.e., the terminal needs to transmit the corresponding ACK/NACK information after a certain processing time interval. If the processing time interval is longer than the GP, no data will be transmitted within a certain period of time, thus wasting the time domain resource. In the embodiments of the present disclosure, the time domain structure as shown in FIG. 3 can utilize the processing time beyond the GP to transmit a downlink control signaling such as UL Grant of subsequent uplink data (for example, next self-contained subframe), so that the processing time interval is fully utilized, as shown in FIG. 4. Alternatively, in the embodiments of the present disclosure, the processing interval may be used to transmit data or control signaling that does not need to get an ACK/NACK feedback immediately, so that the processing time interval may also be fully utilized, as shown in FIG. 5(a) or FIG. 6(a).

Similarly, in the existing UL-dominant self-contained subframe, after the terminal receives the UL Grant, the resource grant information for transmitting the uplink data may be only known by demodulating and decoding the downlink control signaling in which the UL Grant is located. That is to say, the terminal needs to transmit the corresponding uplink data after a certain processing time interval. If the time interval is longer than the GP, no data may be transmitted within a certain period of time, thus wasting the time domain resource. In the embodiments of the present disclosure, the time domain structure as shown in FIG. 3 can utilize the processing time beyond the GP to transmit a downlink control signaling such as ACK/NACK information of previous downlink data (for example, a last self-contained subframe), so that the processing time interval is fully utilized, as shown in FIG. 4. Alternatively, in the embodiments of the present disclosure, the processing interval may be used to transmit data or control signaling that does not depend on the above UL Grant, so that the processing time interval may also be fully utilized, as shown in FIG. 5(b) or FIG. 6(b).

Figure 7:
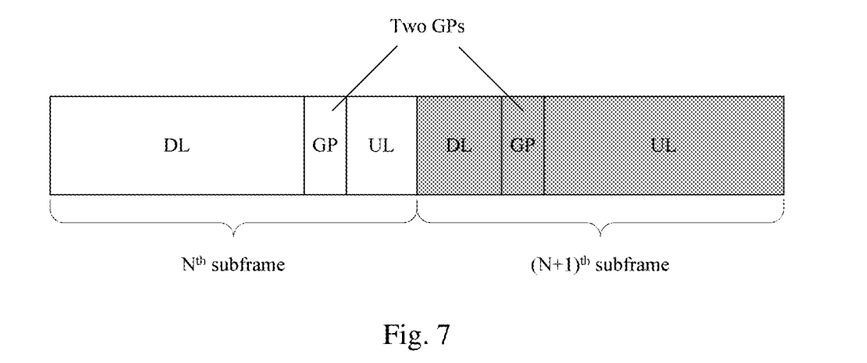
FIG. 7 is a schematic diagram of two adjacent subframes in the related art.

On the other hand, the time domain structure in the embodiments of the present disclosure can save a GP expense. In the related art, if one DL-dominant self-contained subframe and one UL-dominant self-contained subframe are transmitted successively in an adjacent manner, as shown in FIG. 7, an $N^{th}$ subframe is the DL-dominant self-contained subframe, and an $(N+1)^{th}$ subframe is the UL-dominant self-contained subframe, then two GPs need to be reserved. However, two time domain units are arranged alternatively in the time domain structure in the embodiments of the present disclosure, and the two time domain units share one GP, as shown in FIG. 4, which can save the expense of one GP, so as to be capable of saving the time domain resource.

Figure 8:
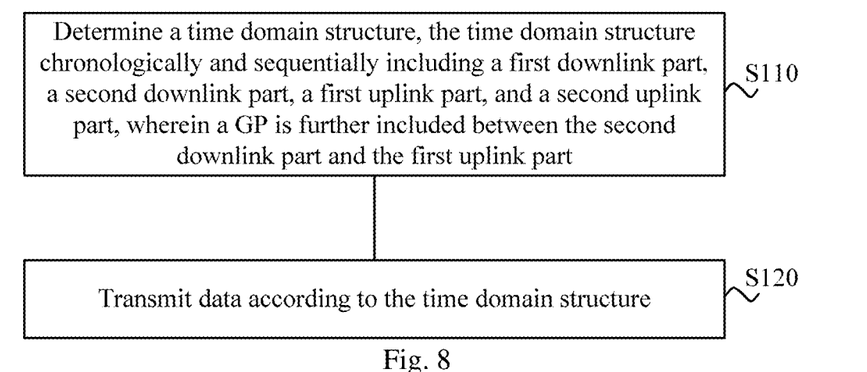
FIG. 8 is a flow chart of a data transmission method according to an embodiment of the present disclosure.

FIG. 8 is a flow chart of a data transmission method according to an embodiment of the present disclosure. The method as shown in FIG. 8 includes the following steps.

In S110, a time domain structure is determined, the time domain structure chronologically and sequentially including a first downlink part, a second downlink part, a first uplink part, and a second uplink part, wherein a GP is further included between the second downlink part and the first uplink part. Information transmitted by the first uplink part corresponds to information transmitted by the first downlink part, and information transmitted by the second uplink part corresponds to information transmitted by the second downlink part.

In S120, data is transmitted according to the time domain structure.

Optionally, as an example, the time domain structure may include a first time domain unit and a second time domain unit, as shown in the foregoing FIG. 4. The first time domain unit may be an $N^{th}$ time domain unit in the entire transmission process, and the second time domain unit may be an $(N+1)^{th}$ time domain unit in the entire transmission process.

For example, if the time domain unit is a subframe, then the first time domain unit may be an $N^{th}$ subframe, and the second time domain unit may be an $(N+1)^{th}$ subframe. Accordingly, when transmitting data in S120, a first subframe to an $(N-1)^{th}$ subframe transmitted previously may be included, and the $(N+1)^{th}$ subframe transmitted thereafter may also be included.

Figure 9:
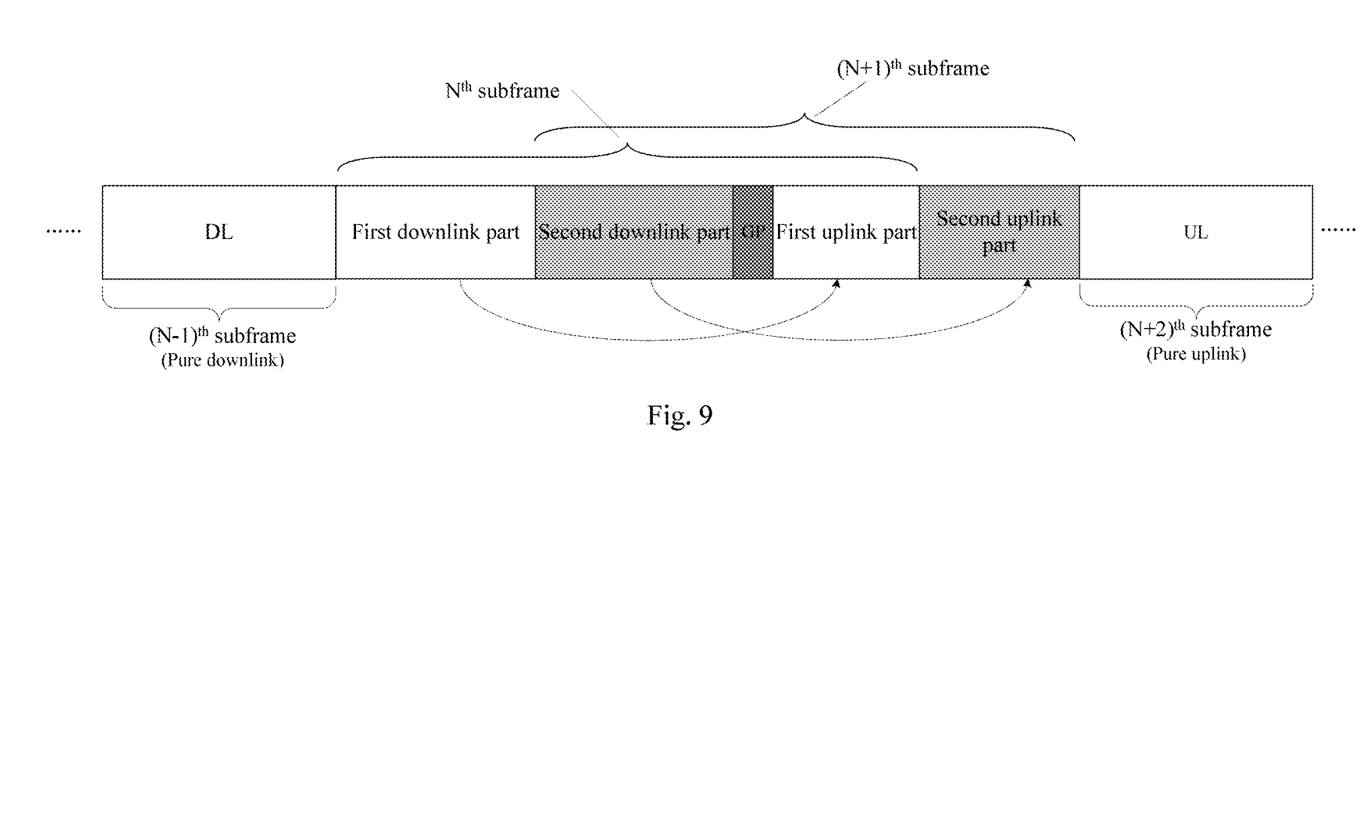
FIG. 9 is a schematic diagram of a time domain structure in data transmission according to an embodiment of the present disclosure.

As an example, as shown in FIG. 9, when transmitting data in S120, all subframes before the $N^{th}$ subframe in the time domain structure are used only for downlink transmission, i.e., only used to transmit downlink information, and are pure downlink subframes. As shown in FIG. 9, the $(N-1)^{th}$ subframe is a downlink subframe. All subframes after the $(N+1)^{th}$ subframe in the time domain structure are only used for uplink transmission, i.e., only used to transmit uplink information, and are pure uplink subframes. As shown in FIG. 9, the $(N+1)^{th}$ subframe is an uplink subframe.

Optionally, as another example, the time domain structure determined in S110 may be as shown in any one of the foregoing FIG. 5(a), FIG. 5(b), FIG. 6(a), and FIG. 6(b).

In S120, if information is transmitted in all of the first downlink part, the second downlink part, the first uplink part, and the second uplink part, then the data, the signaling, and the like, as described in the foregoing portion of FIG. 3 or FIG. 4 may be transmitted. In S120, if information is not transmitted in the second uplink part, then the data, the signaling, and the like, as described in the foregoing portion of FIG. 5 may be transmitted. In S120, if information is not transmitted in the first downlink part, then the data, the signaling, and the like, as described in the foregoing portion of FIG. 6 may be transmitted. To avoid repetition, details are not described herein again.

It may be understood that the method as shown in FIG. 8 may be executed by a transmission device, such as a base station, a terminal, or the like.

In S110, the transmission device may select the time domain structure as shown in FIG. 3 from a plurality of time domain structures. For example, a plurality of time domain structures may be stipulated in a protocol, and one time domain structure among the plurality of time domain structures is the time domain structure as shown in FIG. 3.

The time domain structure in the embodiments of the present disclosure can fully utilize the processing time interval, thus being capable of avoiding wasting the time domain resources.

Figure 10:
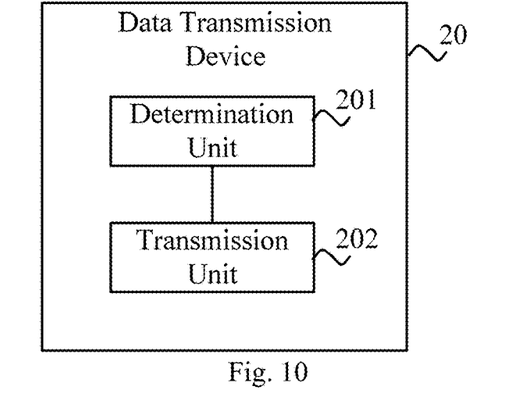
FIG. 10 is a structural block diagram of a data transmission device according to an embodiment of the present disclosure.

FIG. 10 is a schematic diagram of a data processing device according to an embodiment of the present disclosure. The device 20 as shown in FIG. 10 includes a determination unit 201 and a transmission unit 202.

The determination unit 201 is configured to determine a time domain structure, the time domain structure chronologically and sequentially including a first downlink part, a second downlink part, a first uplink part, and a second uplink part, wherein a guard period GP is further included between the second downlink part and the first uplink part.

The transmission unit 202 is configured to transmit data according to the time domain structure determined by the determination unit 201.

Information transmitted by the first uplink part corresponds to information transmitted by the first downlink part, and information transmitted by the second uplink part corresponds to information transmitted by the second downlink part.

Specifically, regarding the time domain structure, reference may be made to the related description in the foregoing embodiments. To avoid repetition, details are not described herein again.

Figure 11:
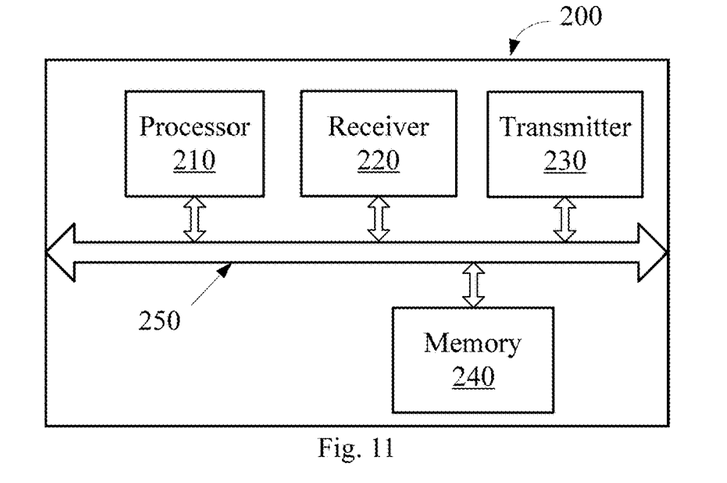
FIG. 11 is a structural block diagram of a data transmission device according to another embodiment of the present disclosure.

It should be noted that in the embodiments of the present disclosure, the determination unit 201 may be implemented by a processor, and the transmission unit 202 may be implemented by a receiver and a transmitter. As shown in FIG. 11, a data transmission device 200 may include a processor 210, a receiver 220, a transmitter 230, and a memory 240. The memory 240 may be configured to store a code and the like executed by the processor 210.

Optionally, the data transmission device 20 in FIG. 10 and the data transmission device 200 in FIG. 11 may be network devices (for example, base stations) or terminals.

Specifically, when the data transmission device is a network device (for example, a base station), the receiver 220 may be configured to receive uplink information transmitted by a terminal in a first uplink part and a second uplink part. The uplink information may include an uplink control signaling and/or uplink data. For the uplink information transmitted by the first uplink part and the second uplink part, reference may be made to the description in the foregoing embodiments. The transmitter 230 may be configured to transmit downlink information to the terminal in the first downlink part and the second downlink part. The downlink information may include downlink control information and/or downlink data. For the downlink information transmitted by the first downlink part and the second downlink part, reference may be made to the description in the foregoing embodiments.

Specifically, when the data transmission device is a terminal, the receiver 220 may be configured to receive downlink information transmitted by a network device (for example, a base station) in a first downlink part and a second downlink part. The downlink information may include downlink control information and/or downlink data. For the downlink information transmitted by the first downlink part and the second downlink part, reference may be made to the description in the foregoing embodiments. The transmitter 230 may be configured to transmit uplink information to the network device (for example, a base station) in the first uplink part and the second uplink part. The uplink information may include an uplink control signaling and/or uplink data. For the uplink information transmitted by the first uplink part and the second uplink part, reference may be made to the description in the foregoing embodiments.

Various components in the device 200 are coupled together by a bus system 250, wherein the bus system 250 not only includes a data bus, but also includes a power bus, a control bus, and a status signal bus.

The device 20 as shown in FIG. 10 or the device 200 as shown in FIG. 11 may implement various processes in the foregoing method embodiment of FIG. 8. To avoid repetition, details are not described herein again.

Figure 12:
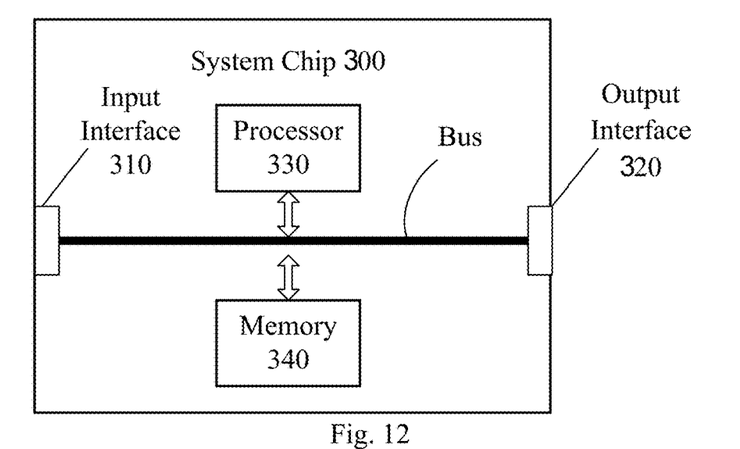
FIG. 12 is a schematic structure block diagram of a system chip according to another embodiment of the present disclosure.

FIG. 12 is a schematic structure diagram of a system chip according to an embodiment of the present disclosure. The system chip 30 of FIG. 12 includes an input interface 310, an output interface 320, at least one processor 330, and a memory 340. The input interface 310, the output interface 320, the processor 330, and the memory 340 are connected by a bus. The processor 330 is configured to execute a code in the memory 340, and when the code is executed, the processor 330 implements the data transmission method performed by the data processing device in FIG. 8.

It may be understood that the processor in the embodiments of the present disclosure may be an integrated circuit chip and has a signal processing capability. In an implementation process, the steps in the foregoing method embodiments may be completed using an integrated logic circuit of hardware in the processor or an instruction in a form of software. The above processor may be a general purpose processor, a Digital Signal Processor (DSP), an Application Specific Integrated Circuit (ASIC), a Field Programmable Gate Array (FPGA) or other programmable logic device, a discrete gate, or a transistor logic device, and a discrete hardware assembly, which may implement or execute the methods, steps, and logic diagrams disclosed in the embodiments of the present disclosure. The general purpose processor may be a microprocessor or the processor may be any conventional processor, or the like. Steps of the methods disclosed with reference to the embodiments of the present disclosure may be directly executed and accomplished by means of a hardware decoding processor or may be executed and accomplished using a combination of hardware and software modules in the decoding processor. The software module may be located in a mature storage medium in the art, such as a random access memory, a flash memory, a read-only memory, a programmable read-only memory, an electrically erasable programmable memory or a register. The storage medium is located in the memory. The processor reads information from the memory and completes the steps of the foregoing methods in combination with the hardware of the processor.

It may be understood that the memory in the embodiments of the present disclosure may be a volatile memory or a non-volatile memory, or may include both volatile and non-volatile memories. The non-volatile memory may be a Read-Only Memory (ROM), a Programmable Read-Only Memory (PROM), an Erasable PROM (EPROM), an Electrically EPROM (EEPROM), or a flash memory. The volatile memory may be a Random Access Memory (RAM) that acts as an external high speed cache. By way of illustration and not limitation, RAM in many forms is available such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It should be noted that the memories of the systems and methods described herein are intended to include but not limited to these and any other suitable types of memories.

Those of ordinary skills in the art may be aware that, in combination with the examples described in the embodiments disclosed herein, the units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by those skilled in the art that, for the purpose of convenient and brief description, for a detailed working process of the foregoing systems, devices, and units, reference may be made to a corresponding process in the foregoing method embodiments, and details are not described herein again.

In the several embodiments provided in the present application, it should be understood that the disclosed systems, devices and methods may be implemented in other ways. For example, the device embodiments described above are merely illustrative. For example, the division of the units is only one kind of logical function division. In practice, there may be other division manner. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, they may be located in one place, or may be distributed on multiple network units. Some or all of the units may be selected according to actual needs to achieve the objectives of the solutions in the embodiments.

In addition, each functional unit in each embodiment of the present disclosure may be integrated in one processing unit, or each unit may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the related art or a part of the technical solutions, may be embodied in the form of a software product. The computer software product is stored in a storage medium including a number of instructions such that a computer device (which may be a personal computer, a server, or a network device, etc.) performs all or a part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk, or an optical disk.

The foregoing descriptions are merely detailed embodiments of the present disclosure, and the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be subjected to the protection scope of the claims.

What is claimed is:

1. A data transmission method, comprising:
   determining a time domain structure, the time domain structure chronologically and sequentially comprising a first downlink part, a second downlink part, a first uplink part, and a second uplink part, wherein a guard period GP is further comprised between the second downlink part and the first uplink part; and
   transmitting data according to the time domain structure;
   wherein, information transmitted by the first uplink part corresponds to information transmitted by the first downlink part, and information transmitted by the second uplink part corresponds to information transmitted by the second downlink part;
   wherein the time domain structure comprises a first time domain unit and a second time domain unit, and wherein the first time domain unit comprises the first downlink part and the first uplink part, and the second time domain unit comprises the second downlink part and the second uplink part.

2. The method according to claim 1, wherein:
the first downlink part is configured to transmit downlink data, the second downlink part is configured to transmit a downlink control signaling, the first uplink part is configured to transmit an uplink control signaling corresponding to the downlink data, and the second uplink part is configured to transmit uplink data scheduled by the downlink control signaling.

3. The method according to claim 1, wherein:
in the first time domain unit, a first blank part is comprised between the first downlink part and the first uplink part; and
in the second time domain unit, a second blank part is comprised between the second downlink part and the second uplink part;
wherein, a time domain length of the first blank part is equal to a sum of a time domain length occupied by the second downlink part and a time domain length of the GP, and a time domain length of the second blank part is equal to a sum of the time domain length of the GP and a time domain length occupied by the first uplink part.

4. A data transmission method, comprising:
receiving, by a terminal, a first downlink part sent by a network device;
receiving, by the terminal, a second downlink part sent by the network device; and
sending, by the terminal, a first uplink part to the network device, wherein the first uplink part and the second downlink part respectively belong to a first time domain unit and a second time domain unit adjacent to the first time domain unit;
wherein the first downlink part and the first uplink part belong to the first time domain unit;
wherein a Guard Period GP is located between the second downlink part and the first uplink part.

5. The method according to claim 4, wherein
the first downlink part is downlink data of the first time domain unit, the first uplink part is an uplink control signaling of the first time domain unit, and the uplink control signaling of the first time domain unit corresponds to the downlink data of the first time domain unit.

6. The method according to claim 4, wherein the first downlink part is a downlink control signaling of the first time domain unit, the first uplink part is uplink data of the first time domain unit, and the uplink data of the first time domain unit is scheduled by the downlink control signaling of the first time domain unit.

7. The method according to claim 4, wherein after sending, by the terminal, the first uplink part to the network device, the method further comprises:
sending, by the terminal, a second uplink part to the network device;
wherein the second downlink part and the second uplink part belong to the second time domain unit.

8. The method according to claim 7, wherein
the second uplink part is an uplink control signaling of the second time domain unit, the second downlink part is downlink data of the second time domain unit, and the uplink control signaling of the second time domain unit corresponds to the downlink data of the second time domain unit.

9. The method according to claim 7, wherein the second uplink part is uplink data of the second time domain unit, the second downlink part is a downlink control signaling of the second time domain unit, and the uplink data of the second time domain unit is scheduled by the downlink control signaling of the second time domain unit.

10. A data transmission method, comprising:
sending, by a network device, a first downlink part to a terminal;
sending, by the network device, a second downlink part to the terminal; and
receiving, by the network device, a first uplink part sent by the terminal, wherein the first uplink part and the second downlink part respectively belong to a first time domain unit and a second time domain unit adjacent to the first time domain unit;
wherein the first downlink part and the first uplink part belong to the first time domain unit;
wherein a Guard Period GP is located between the second downlink part and the first uplink part.

11. The method according to claim 10, wherein
the first downlink part is downlink data of the first time domain unit, the first uplink part is an uplink control signaling of the first time domain unit, and the uplink control signaling of the first time domain unit corresponds to the downlink data of the first time domain unit.

12. The method according to claim 10, wherein the first downlink part is a downlink control signaling of the first time domain unit, and the first uplink part is uplink data of the first time domain unit, and the uplink data of the first time domain unit is scheduled by the downlink control signaling of the first time domain unit.

13. The method according to claim 10, wherein after receiving, by the network device, the first uplink part sent by the terminal, the method further comprises:
receiving, by the network device, a second uplink part sent by the terminal;
wherein the second downlink part and the second uplink part belong to the second time domain unit.

14. The method according to claim 13, wherein
the second uplink part is an uplink control signaling of the second time domain unit, the second downlink part is downlink data of the second time domain unit, and the uplink control signaling of the second time domain unit corresponds to the downlink data of the second time domain unit.

15. The method according to claim 13, wherein the second uplink part is uplink data of the second time domain unit, the second downlink part is a downlink control signaling of the second time domain unit, and the uplink data of the second time domain unit is scheduled by the downlink control signaling of the second time domain unit.

* * * * *